Patented May 25, 1948

2,441,952

UNITED STATES PATENT OFFICE 2,441,952

MANUFACTURE OF ULTRAMARINE

Alling P. Beardsley, Plainfield, and Stanley H. Whiting, Martinsville, N. J., assignors to American Cyanamid Company, New York, N. Y., a corporation of Maine No Drawing. Application July 24, 1945, Serial No. 606,888

4 Claims. (Cl. 106—305)

This invention relates to an improved method of producing high sulfur, high strength ultramarine.

The manufacture of ultramarine, while one of the earliest chemical syntheses to be industrially exploited, has undergone relatively few changes in the last three-quarters of a century. The original ultramarine processes, operated in France and Germany from 1828 until about 1850-60, were the so-called sulfate and sulfate-soda processes. In these processes a mix containing calcined clay, sodium sulfate, and charcoal, in the case of the sulfate process; and clay, sodium sulfate, sodium carbonate, sulfur and pitch in the case of the sulfate-soda process, were fired to produce a pigment which was green, and not blue. This pigment, known as ultramarine green, was sold as such as a green pigment, and if it was desired to produce ultramarine blue the green pigment was oxidized in a separate step by washing it free from sodium sulfate, drying, preferably mixing with about 5% of sulfur, and then firing on a hearth for about a day and cooling off for several days. This second step produced a blue ultramarine which, however, was not of the type sold today as it had a relatively low sulfur content, below 10%, and usually about 5%, and was seriously deficient in strength by modern standards.

After 1860 most plants changed to a process which was carried out physically in a single furnace. A mix containing about equal amounts of kaolin, soda ash and sulfur, with additional silica, and from 10 to 12 of the weight of the soda ash in rosin or pitch, was loaded into crucibles having a definite porosity. These crucibles were then subjected to firing for a period of about two days and permitted to cool for a long period of from ten days to as much as three weeks. During the very slow cooling oxidation took place. This operation in a single furnace produced an ultramarine which was much higher in sulfur than the former type, ranging from an exceptional minimum of 10% up to a normal of 12 to 14%. Also, it was noted that this process, if based on a suitable mix and porous crucibles, never produced ultramarine green. Even if a sample were removed at the time cooling started it would even then be a blue, although a weak or dull blue. This primary ultramarine gained greatly in strength by oxidation during the cooling period to produce secondary ultramarine, the strong, brilliant pigment of commerce. In general, this so-called one-step process, which is really a single operation process, is still in use today and it is the basis of modern secondary ultramarine production.

The oxidation step which increases the strength and brightness of the blue greatly does not have any effect, detectable by chemical analysis, except the removal of from about 1/7 to 1/8 of the sodium in the crude ultramarine, which sodium is transformed into sodium sulfate.

The single operation process using kaolin, silica, soda, sulfur and hydrocarbon has many very serious drawbacks. One is that the secondary ultramarine is not uniform in strength. Even when the greatest pains are taken to attempt to fill each crucible to exactly the same density, provide for identical porosity, and carry out the firing and cooling procedure in exactly the same manner, no two batches of ultramarine come out alike and a good deal of material is of low strength and has to be sacrificed or sold at a much lower price as inferior grade ultramarine.

A second disadvantage, which might be considered a corollary of the first, is that the shade of the ultramarine will vary from furnace to furnace, from one part of a batch to another, and even in different parts of a single crucible. Sometimes the general shade comes out red-blue, and then again greenish-blue, and the problem of producing uniformity of shade has never been solved. Ultramarine manufacturers have to select from a large number of batches to obtain uniform products. This requires developing sales for many different types of blue, a larger inventory because a series of batches may run to an undesired shade, and it is necessary to wait until a desired shade is produced.

A further disadvantage of the ordinary commercial processes today lies in the fact that the output from equipment is very low. The time cycle is excessive. In most cases from raw mix to cooled, furnaced secondary ultramarine from 15 to 20 days must elapse. Ultramarine furnaces represent a considerable capital investment and the fixed charges are therefore high.

According to the present invention we have found that the requirements for the two stages in which the ultramarine reaction necessarily proceeds are entirely different, and that the single operation process is a compromise in which neither stage is carried out under satisfactory conditions. Therefore, according to the present invention the ultramarine is produced in two separate steps under radically different reaction conditions. We have found that the chemically active constituents of furnace gases are injurious if they come into contact with the mixture in the first stage of reaction which produces the weak, dull, primary ultramarine blue. Water vapor adversely affects the product, oxygen is particularly deleterious, and at a certain stage, carbon dioxide is also harmful. Therefore, the first step of the two-step process of the present invention is carried out in a manner so that active furnace gases, and particularly oxygen, are kept from the charge. In a more specific aspect of the present invention this first step is carried out in non-porous ceramic crucibles. It is possible, however, to use crucibles of some porosity, such as those which show a water absorption of less than 10%, and preferably not more than 5%, where the crucibles are of such size that the gases evolved from the reacting charge maintain sufficient pressure, including partial pressure of sulfur vapor, to effectively oppose entry of the furnace gases or at least to reduce such entry to negligible proportions. The amount of damage with a given porosity is, of course, influenced by the size of the crucible, because the ratio of wall area to volume of charge decreases with the dimensions of the crucible. For a practical crucible of at least nine inches in diameter the losses are not serious if the porosity, as measured by water absorption, does not exceed 5%, and therefore slightly porous crucibles are included in the first step in the broader aspects of the present invention.

The first step of the present process may, of course, be carried out with the use of containers of considerably larger diameter than nine inches, but the difficulties of getting heat rapidly to the interior without too great temperature gradient increase rapidly with the diameter.

The ideal conditions for the second step, production of secondary ultramarine, as we have learned them, are very different from those for the first. They comprise two controls:

*a. Control of oxidation.*—Whereas in the first stage any access of oxidizing agent to the charge is harmful, in the second stage it is a necessity. However, if air is used as the oxidizing agent, its access must be controlled, as too free access will over-oxidize the ultramarine, forming valueless white material. A way to control the access of oxygen is to charge the product of the first stage into porous crucibles. Such crucibles can suitably have a porosity of about 16% or higher, as measured by water absorption.

Another, and even better way to control the oxidation, and the way which we prefer, is to use sulfur dioxide in place of air. This use of sulfur dioxide is disclosed and claimed in our copending application No. 606,887, filed July 24, 1945. We find that sulfur dioxide has the power to oxidize ultramarine of the primary stage to ultramarine of the secondary stage but not to over-oxidize it to white. Since the danger of over-oxidation does not exist, there is no need to control the rate of access of sulfur dioxide, except as limited by development of temperature, as described below. For oxidization by sulfur dioxide, the primary stage ultramarine may be placed in non-porous containers, into which sulfur dioxide is fed. The use of sulfur dioxide for oxidizing primary ultramarine to secondary ultramarine is not claimed broadly in this application.

*b. Control of temperature.*—We have found that the temperature at which primary ultramarine is oxidized has a great effect upon the shade of the product. If oxidization occurs at above 550°, the ultramarine is of a blackish shade and is unsuitable for most purposes. Between 200° and 550°, ultramarines of commercial shades can be obtained, but the shade will depend upon the temperature. Comparing the ultramarines obtained by oxidation at 300° and at 500°, the former will be the greener, the latter the redder. The control of temperature we have found to be a matter of much importance, and one of some difficulty, as the reaction of oxidation is exothermic either by air or by sulfur dioxide. In detail, this oxidation is complex and not completely understood. Certainly the primary ultramarine is converted to the secondary ultramarine, and the sodium polysulfides resulting from the firing step are oxidized to sodium sulfate. Both these reactions are exothermic. It is approximately their sum which furnishes the heat which must be removed if the temperature is to be controlled.

In order to control the temperature during the oxidation period within the zone of 200°–550° C. (and preferably at about 400°–550° C.), we find it desirable to provide apparatus for the second stage in which heat can be first applied to the blue of the primary stage to raise it to the desired temperature for oxidation, and then heat can be withdrawn from the charge as the oxidation develops heat within.

It is clear from the above that the present single operation process is a compromise. The crucibles, in order to be porous enough for the oxidation step, have to be too porous for the firing step. The temperature during oxidation follows the whole range downward from the top firing temperature of 750° (in many parts of the furnace 850° or higher) to substantially atmospheric. We believe that in this wide range of temperature of oxidation in the present process lies one of the principal causes of the unpredictable variations in shade found by the ultramarine manufacturer. However, we do not wish to limit our invention to any theory of reaction. In the present process no compromise is necessary. The oxidation step can be carried out in containers most suited to it without regard to the requirements of the first or firing step. The long time for oxidation which is dictated by the necessity for low porosity crucibles in the first step is not encountered. This is particularly true when sulfur dioxide is used as the oxidizing gas.

A particularly important factor in the present invention is that the oxidation step can be carried out under exact temperature control. It is no longer necessary to permit the ultramarine crucibles to cool at the rate dictated by the furnace characteristics. This is of prime importance, because over-oxidation which results in loss of color, finally producing a white or grayish product, is much more dangerous at high temperatures and excessively high temperatures are also likely to produce a blackish secondary blue.

In the ordinary commercial process the ultramarine manufacturer has no control. His crucibles cool down continuously and he cannot keep them at exactly the best temperature for the necessary time for the desired type of oxidation. When, however, this step is carried out in different apparatus the conditions can be accurately controlled and no compromise is necessary. In addition to producing more uniform, higher quality secondary ultramarine in better yield, the two-step process of the present invention also effects a marked saving in time, with a correspondingly greater output from a given size of equipment.

The increase in strength obtainable by the two-step process of the present invention is quite startling. It is possible with careful operation to produce an ultramarine having 75% greater strength than the normal commercial ultramarine produced by the standard one-step process in commerce used today. At the same time this great increase in strength is obtained without additional production costs, as any additional handling is offset by the shortened time cycle.

The preferred modification of the present invention involves the use of an impervious ceramic material which, preferably, should also show a low coefficient of expansion with temperature and a high coefficient of heat conductivity. Fused silica is an excellent product on account of its low coefficient of expansion. Other impervious ceramics which exhibit the characteristics mentioned, such as those containing silicon carbide, may also be used. The ceramic ware must withstand fairly fast heating rates, temperature rises of about 100° C. per hour or more being desired to obtain the most economical throughput.

The use of impervious ceramic containers, which constitutes the preferred modification of the present invention, should not be confused with the use of brick lined metal containers. Such a procedure was proposed in 1891. It was never practical and the reasons are obvious. The refractory lining and the metal have different coefficients of expansion, and as soon as a crack forms sulfur vapor, which is always present in the first heating stage, rapidly attacks the metal causing it to swell which still further cracks the lining. In the present invention the high shock-resisting ceramic ware prevents contact of deleterious gases with the ultramarine mix, and as it is free from metal no difficulties are encountered with sulfur corrosion or contamination of the product with undesirable metal sulfides.

The preferred embodiment of the two-stage process involves the transfer of the product of the first stage from its containers to other containers in which the second stage can be more suitably carried out. This requirement—the transfer of the charge—can be most conveniently met if the original mix is converted into briquet form before it is charged into containers for the first stage. The conversion of the raw mix into briquets is disclosed in our copending application No. 606,886, filed July 24, 1945. This improvement is not claimed, per se in the present application.

Throughout the specification and claims the term "primary ultramarine" will be used to cover the product obtained in the first firing stage up to about 750° C. before oxidation. The ultramarine produced in the first stage and which is referred to as primary ultramarine is a blue pigment although dull and of no strength. The contents of a crucible appear green because the blue primary ultramarine is mixed physically with yellow sodium polysulfides formed in the firing. Similarly in the specification and claims the terms "secondary ultramarine" will be used to cover the blue pigment obtained by oxidation of the primary ultramarine. The two terms above defined will be used in no other sense.

The term "high strength, high sulfur ultramarine" will be used in the claims in its customary sense to mean modern ultramarine of high color value having a sulfur content of at least 10%.

The invention will be described in detail in connection with a typical operation under the two-step process of the present invention. The parts are by weight.

Example I

A mixture of:

| | Parts |
|---|---|
| Dried china clay | 115 |
| Soda ash | 110 |
| Sulfur | 120 |
| Diatomite | 29 |
| Rosin | 13.6 |
| Caustic soda | 1 | was thoroughly ground together in a pebble mill. The mixture was packed into fused silica crucibles and fired in a furnace whose temperature was raised 50° C. per hour to a temperature of 700° C.; where it was held from 4 to 8 hours.

The crucibles were cooled, the green-colored contents removed to porous alundum cylinders, the cylinders well sealed and inserted into a furnace whose temperature was 350° C. While the temperature was held at 350°, air was circulated slowly through the furnace and around the cylinders till the percent of oxygen in the exit air equalled that in the inlet air, and then for 2 hours more. After cooling, the ultramarine was washed, wet-ground in a pebble mill loaded with about ¾" pebbles, dried and tested. The strength averaged 135% of the strength of the same composition of mix, fired and oxidized in plant furnaces in the usual single operation.

Example II

A mix was made of the following composition:

| | Parts |
|---|---|
| Calcined clay | 822 |
| Diatomite | 112 |
| Soda ash | 743 |
| Rosin | 30 |
| Charcoal | 30 |
| Sulfur | 665 |

This was ground in a pebble mill containing pebbles of about ¾" dia. The ground mix was briquetted cold by pressure, the briquets placed in an impervious fused silica container, heated to a temperature of 720° C. during six hours and held there four hours. After cooling, the briquets were removed, cracked, and transferred to another fused silica container in which they were heated to a temperature of about 420° while sulfur dioxide was supplied to them. After oxidation was completed, the blue was washed, wet-ground in a pebble mill with pebbles of about ¼" to ⅜" dia., and tested for strength. The strength was found to be 200% of the average blue of the highest strength being made in the factory at the same period in the usual single operation.

It will be noted that when the two-step process is used with sulfur dioxide as the oxidizing agent, the results are even better than in Example I where the oxidation was effected with oxygen.

We claim:

1. In a two-step process for producing high strength, high sulfur "secondary ultramarine" in which a raw, high sulfur ultramarine charge is fired at a reaction temperature of not more than about 750° C. to form "primary ultramarine" followed by controlled oxidation of the "primary ultramarine" to "secondary ultramarine," the improvement which comprises maintaining the charge in the first step substantially free from chemically reactive gases, cooling the fired charge, and carrying out the oxidation of the "primary ultramarine" in a separate step at a temperature of about 200°–550° C.

2. A method according to claim 1, in which the oxidation of "primary ultramarine" to "secondary ultramarine" is effected at a substantially constant elevated temperature, cooling being employed at the beginning of the controlled reaction until the sulfides present in the "primary ultramarine" are substantially oxidized.

3. The process according to claim 1 in which cooling is applied during oxidation of residual sulfides until approximately 1/7 to 1/8 of the combined sodium in the "primary ultramarine" has been converted to sodium sulfate.

4. A method according to claim 1 in which the oxidation of "primary ultramarine" to "secondary ultramarine" is effected at a temperature from 400 to 550° C.

ALLING P. BEARDSLEY.
STANLEY H. WHITING.

REFERENCES CITED

The following references are of record in the file of this patent:

FOREIGN PATENTS

| Number | Country | Date |
|---|---|---|
| 6,959 | Great Britain | 1911 |
| 9,200 | Great Britain | 1890 |
| 206,466 | Germany | Oct. 22, 1907 |

OTHER REFERENCES

"Manufacture of Colors for Painting," by Riffault, Vergnaud, Toussaint, 1874, pages 304, 305, 311, and 319.